United States Patent Office 3,145,441
Patented Aug. 25, 1964

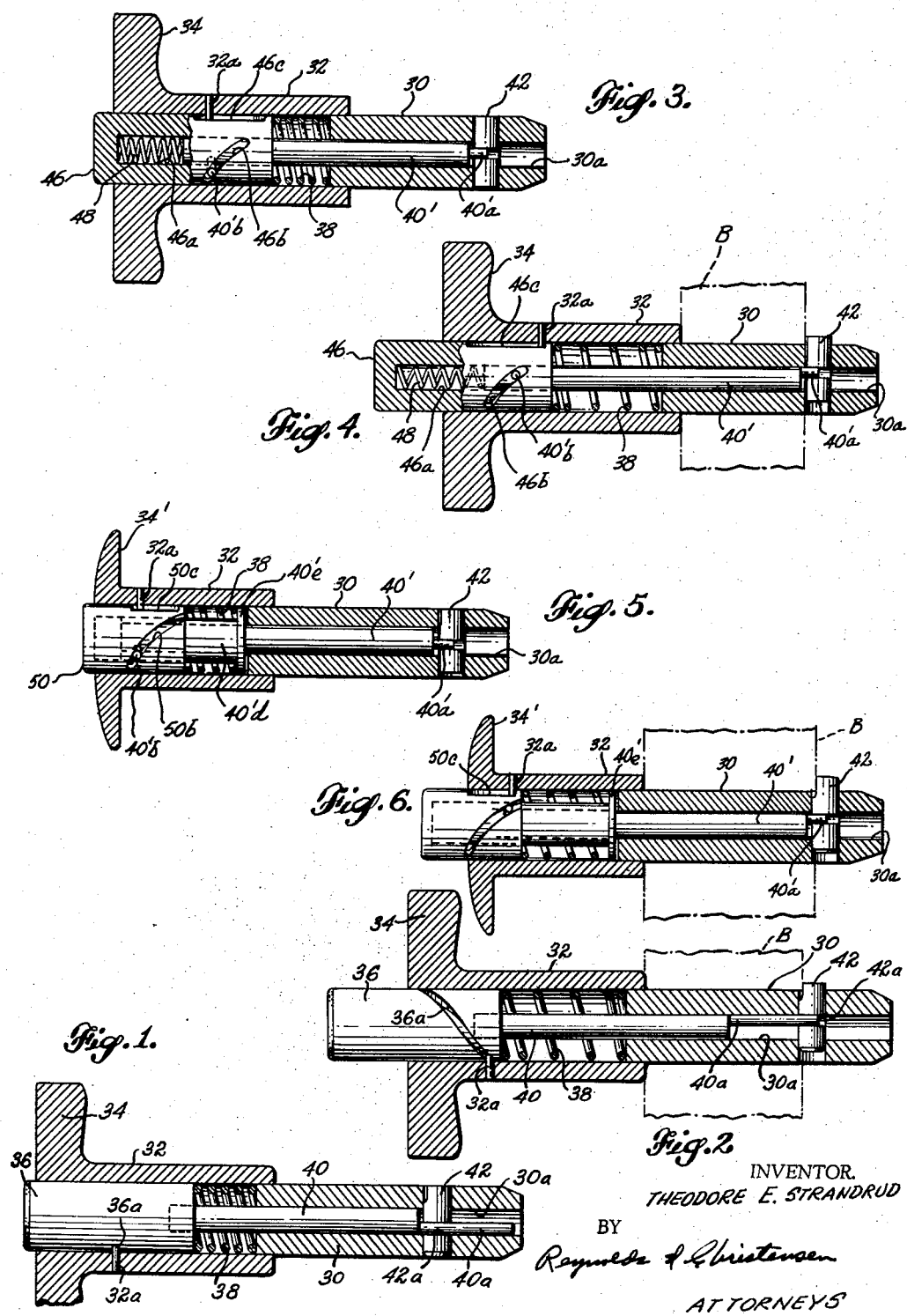

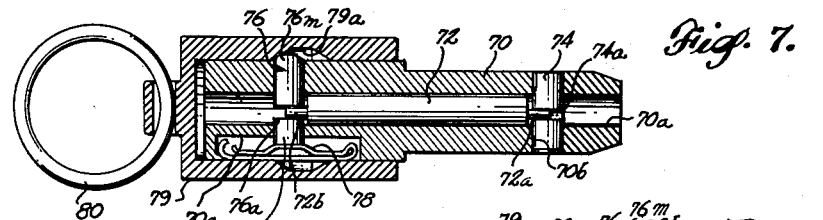
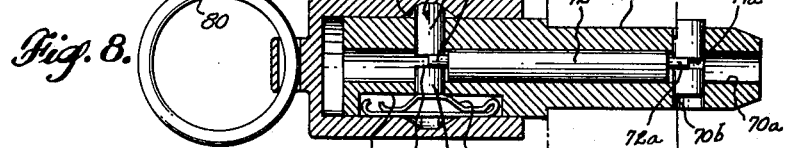
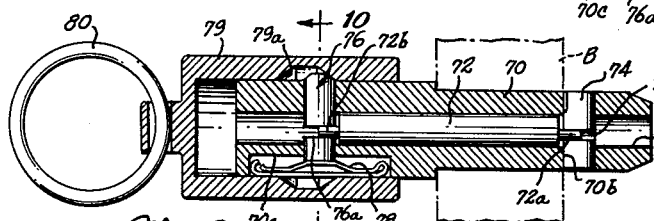
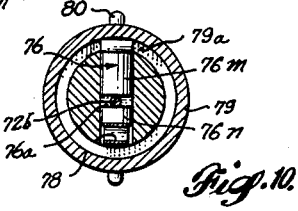
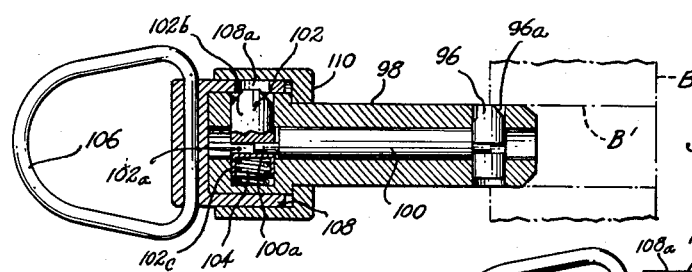
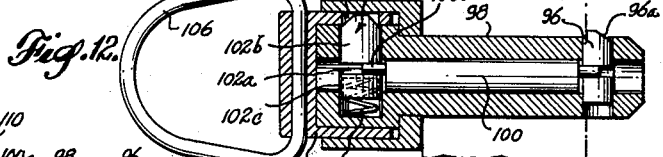
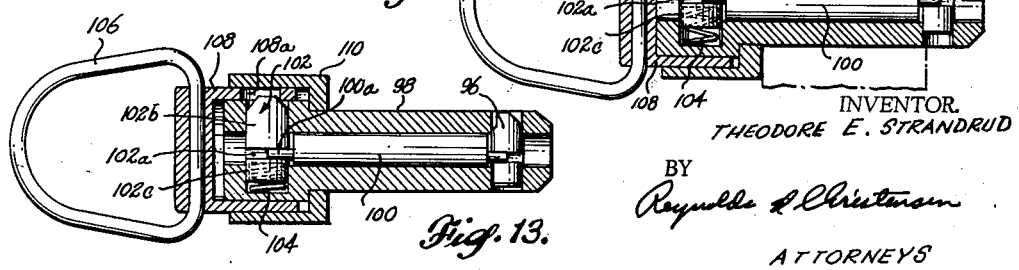

3,145,441
QUICK RELEASE LOCKING ELEMENT PIN
Theodore E. Strandrud, Seattle, Wash., assignor to The Boeing Company, Seattle, Wash., a corporation of Delaware
Filed Apr. 9, 1962, Ser. No. 186,002
4 Claims. (Cl. 24—211)

This invention relates to improvements in locking pins of the type having a projectable locking element at one end and an operating means at the opposite or control end by which the locking element, when retracted for insertion of the pin through a hole will protrude after insertion, whereby it is locked positively against retraction, or may be released by the operating means for retraction of the pin from the hole. The invention is herein illustratively described by reference to representative embodiments thereof; however, it will be recognized that still other modifications and changes therein with respect to details may be employed without departing from the essential features involved.

In some applications lock pins serve to maintain two or more bodies in mutually overlapping positions by extending through aligned apertures in such bodies, in which case the pin is loaded in shear. In still other applications these pins serve as tie fasteners or anchoring devices, in which case they are loaded in tension or in bending depending upon the direction of pull in relation to the pin axis. In these applications heavy tension loads must sometimes be borne without danger of accidental release and without undue stress concentration exerted by the locking elements on the aperture rim, particularly if the apertured body comprises a soft or readily damaged material.

In many applications compactness and lightness of weight are essential. In practically all cases positive-acting, quickly operated mechanism for locking and releasing the pin is desirable. In certain cases it is desirable to provide locking and releasing mechanism operable by either pushing or pulling on a control member, such as a plunger, whereas in other situations single-acting devices for this purpose may be sufficient or even necessary. Depending on the particular application, a locking and releasing mechanism which operates by a plunger reciprocative either lengthwise or transversely of the pin may serve best. Lock pin devices with ends which project only to a minimum extent beyond the inner surface of the objects or bodies in which installed are also desirable in many cases.

This invention is directed broadly to improved lock pins satisfying the foregoing and related requirements and objectives either singly or in various combinations.

Specifically, the improved locking element pins may be of compact, light-weight construction, present minimum projection beyond the retaining surface of the body or bodies in which installed, operate positively and quickly for either locking or releasing the pin, or both, and withstand heavy loads in tension or otherwise. Such devices operate on a principle which minimizes any tendency for binding or freezing of parts; yet if the release mechanism fails to retract the locking element by normal actuation the locking element may be forced to a retracted position in order to release the pin for removal. The novel locking elements are or may be so formed that maximum loading in tension of the pin may be sustained without applying undue stress concentration on the aperture rim, without danger of overloading the locking element or forcing its retraction, and without canting of the pin in the aperture.

Important related objects are to provide an improved means for controlling and limiting actuation of the locking element, resulting in a simple low-cost construction, reliable self-locking operation, and adaptability for use in plain round apertures not critical in size and without tracks or specially shaped retaining apertures. Moreover, due to the locking element forms used and their mode of operation, tension loading capability is not adversely affected. Further the invention embodies constructions in which there is less chance for inadvertent release of the locking pins than heretofore.

An improved locking element pin of this invention as herein disclosed incorporates a rotative spindle having an eccentric or crank finger at its inner or locking end operatively engaged in a slot in a transversely directed projectable and retractable locking element. Usually of generally cylindrical form, the locking element itself is guided for reciprocation transversely in the pin as the spindle rotates. Displacement of the locking element toward locking (i.e. projected) position is preferably effected by a spring applying torque to the spindle or by like spring means. Spring-actuated displacement of the locking element is limited at the locking position by bottoming of the eccentric in the locking element slot which thereby arrests spindle rotation at a certain point. Preferably reverse displacement of the locking element, effected manually, to unlock the pin is also limited positively in the same manner and by the same means. This concept of establishing the limits of spindle rotation and also locking element displacement by engaging an actuation eccentric in a locking element slot of restricted depth greatly simplifies and reduces the cost of manufacturing locking element pins. It avoids close manufacturing tolerances and makes for compact pin structures. Moreover, it leaves room for and simplifies the incorporation of spring mechanism in the outer or control end of the pin structure, since no other mechanism is necessary to establish positional limits of the moving parts.

Rotation of the spindle may be effected in any of different ways, but preferably by straight-line movement of a plunger at the control end against the force of a spring which, upon release, returns the spindle and hence the locking element to its normally projected or locking position, and the plunger to its initial position. In one such embodiment a spiral cam and follower rotate the spindle, the cam being rotated by reciprocation of a plunger acting against the force of a coil spring. In still another embodiment a plunger having a slot engaged by an eccentric on the spindle rotates the spindle as the plunger is actuated. By employing a double-acting cam in this latter type of arrangement, release of the locking element is effected by either pushing or pulling on a plunger actuator.

These and other features, objects and advantages of the invention will become more fully evident from the following description thereof by reference to the embodiments shown in the accompanying drawings.

FIGURE 1 is a longitudinal sectional view of an embodiment with its locking element retracted; FIGURE 2 is a corresponding view with the locking element extended.

FIGURE 3 is a longitudinal sectional view of a further embodiment with its locking element retracted; while FIGURE 4 is a corresponding view of the same embodiment with its locking element extended.

FIGURES 5 and 6 are longitudinal sectional views of a still further embodiment respectively showing the locking element thereof in the retracted and extended positions.

FIGURES 7, 8 and 9 are longitudinal sectional views of a different embodiment illustrating the different operating positions thereof; and FIGURE 10 is a sectional view taken on line 10—10 in FIGURE 9.

FIGURES 11, 12 and 13 are longitudinal selectional views of a still further embodiment with the parts in different operating positions.

In the embodiment of FIGURES 1 and 2 the pin body comprises a longitudinally bored shank portion 30 and a larger tubular extension 32 affixed to shank portion 30; the extension 32 has a head or handle 34 on the end thereof opposite the shank portion 30, whereby the device can be withdrawn from its hole. The bore in the tubular extension 32 preferably is of the size of the exterior of the shank portion 30 and serves as a guide for a cylindrical plunger 36 affixed to and coaxial with spindle 40. In the space within the tubular extension 32 between the plunger 36 and the end of the shank 30, a helical spring 38 is retained, surrounding the rotary spindle 40. The spindle 40 is guided in the bore 30a within the pin shank 30, and one end thereof carries a projecting eccentric finger 40a which passes through, and reciprocates transversely within a slot 42a in the locking element 42. As already been stated, the opposite end of the spindle is fixed to the inner end of the plunger 36 so that they reciprocate axially conjointly.

The peripheral surface of the plunger 36 within the tubular extension 32 has a spiral groove 36a engaged by a fixed pin 32a mounted in the wall of extension 32. When handle 34 is held in the fingers of one hand and the thumb of the same hand is used to press on the plunger 36, the plunger and thereby the spindle 40 are caused by this pin and spiral groove to rotate. Such rotation of the spindle, when parts are in the position of FIGURE 2, causes the eccentric finger 40a to turn and thereby to retract the locking element 42 from its normally projected or locking position in which it is normally held by the spring 38. With the element 42 thus retracted the lock pin's shank 30 can now be advanced through the hole in body B until the locking element 42 can project and engage the inner surface of body B, locking the pin in place. Such projection occurs under the influence of spring 38 when the pressure on plunger 36 is relieved. Removal of the lock pin is effected by pressure upon the plunger to retract the locking elements 42 again, and withdrawal of the assembly by a pull on handle 34, as has already been explained. In this embodiment it will be noted that the eccentric finger 40a must be free to advance lengthwise through the slot 42a in the locking element 42 because the spindle itself reciprocates as well as rotates accompanying operation of the locking element. This is the only illustrated embodiment in which the spindle itself moves lengthwise and, in some cases, it may not be the preferred embodiment, particularly where a compact lock pin is required with minimum projection of its ends beyond the surfaces of the body B in which the pin is installed. Transverse depth of the slot 42a limits rotation of the spindle at certain positions and thus establishes the limit positions of the locking element.

The modification shown in FIGURES 3 and 4 employs a pin shank 30 and fixedly mounted extension 32 with handle 34 generally similar to the correspondingly numbered parts in the immediately preceding embodiment. Also, the locking element 42 may be similar and therefore bears a similar reference numeral. In this embodiment, however, the spindle 40' is not required to reciprocate longitudinally but only to rotate within the guide bore 30a in order to actuate the locking element 42. In this case, the plunger 46 has a central bore 46a in which the outer end of the spindle 40' is slidably received. A helically configured slot 46b in the wall of the plunger 46 surrounding the spindle 40' receives a follower pin 40'b mounted in the spindle 40. A longitudinal groove 46c in the outer wall of the plunger 46 receives a fixed pin 32a mounted in the wall of the tubular extension 32. This latter pin and groove prevent rotation of the plunger as it is moved lengthwise in the tubular extension 32, whereas the helical slot or groove 46b and the pin 40'b cause rotation of the spindle 40' during such motion of the plunger. A return spring 38 serves the same function as the spring 39 in the preceding embodiment, namely, to urge the locking element into locking position. A spring 48 received in the base of the plunger 46 behind the end of the spindle 40' insures that the spindle is pressed in the direction toward the locking element so that the eccentric finger 40'a is maintained in the locking element slot and is not frictionally dragged therefrom by retraction of the plunger 46.

In the variation shown in FIGURES 5 and 6, parts which correspond essentially to those in FIGURES 3 and 4 bear the same reference numerals and parts which differ only slightly therefrom bear a similar reference numeral primed. In this instance, the hollow plunger 50 slidably receives an enlarged extension 40'd of the spindle 40' and has a helical slot 50b in its wall which is engaged by a follower pin 40'b projecting radially from the enlargement 40'd. A longitudinally extending slot 50c in the exterior of the plunger 50 is engaged by the stationary pin 32a so that as the plunger is moved lengthwise of the device it does not rotate, but it does cause rotation of the spindle through the action of the helical groove 50b and follower pin 40'b. The return spring 38 in this case reacts between the inner end of the plunger 50 and an annular collar 40'e on the spindle 40'. Thus the one spring 38 serves the functions of the spring 38 and spring 48 in the preceding embodiment by returning the plunger to its normal position so as to effect return rotation of the spindle 40' into the normally locked condition of the locking element 42 and so as to insure that the locking element slot will be continuously engaged by the eccentric finger 40'a.

In the embodiment of FIGURES 7 through 10 the pin body 70, having longitudinal bore 70a therein and transverse aperture 70b, receives the rotary spindle 72 and the transversely reciprocable locking element 74 with eccentric finger 72a engaging slot 74a, generally as in previous embodiments. In this instance, the spindle 72 carries a second eccentric finger 72b, but on its control end, opposite that which carries eccentric finger 72a. Eccentric finger 72b projects into a space 76a between the two parts 76m and 76n of a two-part plunger 76 which is received slidably in a transverse bore in the control end of pin body 70, opposite the end which carries the locking element 74. Plunger 76 is urged endwise in one direction by a leaf spring 78 which is retained in a side cavity or pocket 70c in the enlarged end portion of body 70 by the skirt portion of cap 79. The latter constitutes in effect an axially reciprocable plunger, and has a ring handle 80 and fits slidably over the enlarged portion of pin body 70. It also has an annularly extending groove 79a on its inside wall into which the end of the plunger part 76m projects under pressure of the leaf spring 78. The sides of groove 79a (i.e., toward respectively opposite ends of the pin) slope oppositely. This groove has sufficient depth and width to accommodate the end of the plunger 76 projected outward far enough to rotate the spindle 72 into the normally locked position of the locking element 74 as shown in FIGURE 8. If the cap 79 is pushed, as FIGURE 7 illustrates, one sloping side of the groove 79a wedges the plunger 76 out of the groove and against the spring 78 in order to rotate the spindle 72 and retract the locking element 74 as a result of the composite camming action of the two eccentric elements 72b and 72a. Likewise, pulling on the handle 80 causes the opposite sloping side of the groove 79a to effect a similar camming action and consequent retraction of the locking element 74 (FIGURE 9). This embodiment, therefore is for retraction of the locking element either by pushing or pulling on the handle element or operating plunger in order to release the locking device. This facilitates both the insertion and removal of the pin.

Point staking (not shown) on the pin body at the lower end of the locking element aperture is necessary as a last step (after cap 79 is installed) to allow retention of the cap after it is installed. During installation of cap 79 spring 78 is compressed more than it would be in service to allow the cap to slip over the top of the plunger.

In FIGURES 11, 12 and 13 the locking element 96 has a beveled outer corner 96a which faces endwise of the lock pin toward the body or object B into which the unit is to be inserted. Camming action against the rim of the aperture B' during pin insertion forces the locking element into its retracted position. Lock pin body 98 has a central bore which receives the rotary spindle 100 as in preceding embodiments. The spindle is rotated at will by means of an eccentric pin 100a engaged in the space or slot 102a formed between the two parts 102b and 102c of the transversely reciprocable plunger 102. Part 102c is urged by a spring 104 against eccentric pin 100a, to urge parts into the locked position. A handle 106 is carried by a member having an annular skirt 108 extending slidably over the enlarged end portion of the pin body 98 and received within the protective cover 110. A hole 108a in skirt 108 normally accommodates the projecting outer end of the plunger 102 when the locking element 96 is in its locked position as shown in FIGURE 12. Pulling on the handle 106 causes one edge of hole 108a to bear as a cam against the adjacent sloping surface of the plunger 102 in order to rotate the spindle and retract the locking element 96. Pushing the locking element pin into a hole B' can also be arranged to actuate the plunger portion 102c against spring 104, and so to retract the locking element 96.

In the double-acting embodiments shown in FIGURES 7 through 13 the ring is pulled in removing the pins from the hole, but the end face of the cap is normally pushed to install the pin in the first instance. This is the natural manner of operation, and makes a mistake unlikely. In other embodiments the pin may be removed by pulling on the ring with one hand while the locking device is held in the unlocked condition by the other hand. In either case the operating plunger would move axially of the locking pin.

It will be evident that the only relation between the body B and the pin is that the body B supports the pin, and the distance between the outer handle of the pin and the locking element 42 should be equal to or greater than the aggregate thickness of body B. If the body B is made up of two or more overlapping thicknesses which pin shank 30 is to hold overlapped, the distance between head 32 or the like and the element 42 must be at least equal to the aggregate thickness. If pin shank 30 is merely to be anchored to body B as a support, that distance must be at least equal to the thickness of body B. The body has no other relation to the locking pin, and is not a part of this invention.

The above and other aspects and embodiments of the invention will be evident to those skilled in the art on the basis of the foregoing description of the presently preferred practices thereof. In general, the use of point staking techniques, segmentation of parts and other methods of facilitating assembly of components in these locking element pin devices are not described in detail herein and may vary with different designs. Moreover, different pin body and handle configurations and different locking element configurations are readily possible within the scope of the novel principles described.

I claim as my invention:

1. A quick-release locking device of the character described for support in a hole in a supporting body, said locking device comprising a pin body having a locking end and a control end, and bored in the axial direction, and having a transverse aperture at its locking end, a locking element reciprocatively guided in said transverse aperture for retraction and protrusion into locking position, beyond the inner end of the hole in the supporting body a spindle rotatively supported in said bore, means interconnecting the locking end of said spindle and said locking element for converting rotative movement of the spindle into reciprocative movement of the locking element, a plunger guided at the control end of the pin body for axial reciprocation, and cam means for converting reciprocative movement of the plunger into rotative movement of the spindle.

2. A quick-release locking device for support in a hole in a supporting body, said locking device comprising a pin body having a locking end and an opposite control end, and bored in the axial direction, and having a transverse aperture at its locking end located beyond the inner end of the hole in the supporting body, a locking element reciprocably guided in said transverse aperture for retraction and protrusion into locking position, a rotary spindle supported in said bore, means interconnecting the locking end of said spindle and said locking element for converting rotary movement of the spindle into reciprocative movement of the locking element, a plunger at the control end of the pin body and guided thereby for movement in the axial direction, and a camming device operative upon said plunger and operatively connected to said spindle to convert axial reciprocation of the plunger into rotation of the spindle.

3. The device defined in claim 2, wherein the plunger and spindle are interconnected for conjoint axial reciprocative movement, as well as for rotative movement of the spindle relative to the locking element.

4. The device defined in claim 2, wherein the plunger is axially reciprocative relative to the spindle, and the camming device interconnects said plunger and said spindle, to effect rotation of the spindle upon axial reciprocation of the plunger.

References Cited in the file of this patent

UNITED STATES PATENTS

| 758,333 | Pfleghar | Apr. 26, 1904 |
| 1,786,332 | Bradshaw | Dec. 23, 1930 |
| 2,093,526 | Olson | Sept. 21, 1937 |
| 3,046,827 | Myers | July 31, 1962 |

FOREIGN PATENTS

| 367,269 | France | Aug. 27, 1906 |
| 560,313 | Great Britain | Mar. 29, 1944 |